(12) United States Patent
Keerthi

(10) Patent No.: US 8,457,885 B2
(45) Date of Patent: Jun. 4, 2013

(54) COMPUTING PATHS BETWEEN GEOGRAPHICAL LOCALITIES

(75) Inventor: Arvind Vijay Keerthi, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/498,556

(22) PCT Filed: Jun. 16, 2011

(86) PCT No.: PCT/IB2011/052612
§ 371 (c)(1),
(2), (4) Date: May 9, 2012

(87) PCT Pub. No.: WO2012/104682
PCT Pub. Date: Aug. 9, 2012

(65) Prior Publication Data
US 2012/0232796 A1    Sep. 13, 2012

(30) Foreign Application Priority Data
Feb. 1, 2011 (IN) .............................. 296/CHE/2011

(51) Int. Cl.
*G08G 1/123* (2006.01)

(52) U.S. Cl.
USPC ........... 701/438; 701/428; 701/516; 455/440; 455/443; 455/445; 379/9.02; 379/88.01; 379/88.03; 342/356; 342/357.31; 196/14.52; 196/132

(58) Field of Classification Search
USPC .................. 701/428, 438, 516; 455/440, 443, 455/445; 379/9.02, 88.01, 88.03; 342/356, 342/357.31; 196/14.52, 132
See application file for complete search history.

(56) References Cited

U.S. PATENT DOCUMENTS

| | | | | |
|---|---|---|---|---|
| 5,030,117 | A | * | 7/1991 | Delorme ....................... 434/130 |
| 5,452,212 | A | * | 9/1995 | Yokoyama et al. ........... 701/428 |
| 5,848,373 | A | * | 12/1998 | DeLorme et al. ............. 701/455 |
| 5,923,730 | A | * | 7/1999 | Takaki ........................ 379/15.02 |
| 7,389,181 | B2 | * | 6/2008 | Meadow et al. .............. 701/522 |
| 7,660,441 | B2 | * | 2/2010 | Chen et al. .................... 382/113 |
| 7,805,239 | B2 | | 9/2010 | Kaplan et al. |
| 8,200,247 | B1 | * | 6/2012 | Starenky et al. ........... 455/456.3 |
| 2003/0182052 | A1 | | 9/2003 | DeLorme et al. |
| 2006/0075442 | A1 | * | 4/2006 | Meadow ......................... 725/91 |
| 2009/0150389 | A1 | * | 6/2009 | Knorr ............................... 707/5 |
| 2009/0319172 | A1 | * | 12/2009 | Almeida et al. .............. 701/201 |
| 2010/0118025 | A1 | | 5/2010 | Smith et al. |
| 2010/0185382 | A1 | | 7/2010 | Barker et al. |
| 2011/0098056 | A1 | * | 4/2011 | Rhoads et al. ............. 455/456.1 |
| 2011/0208427 | A1 | * | 8/2011 | Jansen et al. .................. 701/208 |
| 2012/0154633 | A1 | * | 6/2012 | Rodriguez ............... 348/231.99 |

OTHER PUBLICATIONS

"Comparing Five Free Road Trip Planners," Feb. 15, 2008, AreWeThereYet?AreWeThereYet? Travel with your children, not against them [website].
PCT International Search Report for International Application No. PCT/IB2011/052612, filed Jun. 16, 2011, mailing date: Sep. 28, 2011.

* cited by examiner

*Primary Examiner* — McDieunel Marc
(74) *Attorney, Agent, or Firm* — Perkins Coie LLP

(57) ABSTRACT

Technology is generally described for computing paths between geographical localities. The technology can receive a request for a path between two or more geographical localities, and compute a path based at least on a popularity rating of intermediate geographical localities.

53 Claims, 17 Drawing Sheets

400

| | 402 | 404 | 406 |
|---|---|---|---|
| | id | geographical locality | popularity rating |
| 408 | 1 | A | 5 |
| 410 | 2 | B | 25 |
| 412 | 3 | C | 10 |
| 414 | 4 | D | 7 |
| 416 | 5 | E | 15 |
| | ⋮ | ⋮ | ⋮ |

420

| | 422 | 424 | 426 | 428 |
|---|---|---|---|---|
| | id | geographical locality | connected locality | weight |
| 428 | 1 | A | B | |
| 430 | 2 | A | C | 15 |
| 432 | 3 | B | C | 2 |
| 434 | 4 | B | D | 15 |
| 436 | 5 | B | E | 3 |
| | ⋮ | ⋮ | ⋮ | ⋮ |

COMPUTING PATHS BETWEEN GEOGRAPHICAL LOCALITIES

BACKGROUND

Various techniques exist for computing paths between geographical localities. As examples, BING® MAPS, GOOGLE® MAPS, and MAPQUEST® are online services that receive an origin and destination and compute paths from the origin to the destination. In all three cases, however, directions are provided in terms of turn-by-turn directions.

Turn-by-turn directions are directions suitable for people who are familiar with reading maps or who reside in developed areas where all streets have names. However, in some areas, e.g., in some developing countries, not all streets have street names. Moreover, many people in these areas do not think of directions in terms of streets, distances, and turns.

SUMMARY

Technology is described for computing paths between geographical localities. The technology can receive a request for a path between two or more geographical localities, and compute a path based at least on a popularity rating of intermediate geographical localities.

The technology can receive a set of four or more identifications of geographical localities, wherein at least one of the geographical localities is generally identifiable by a name or region but not a postal street address; receive a set of connections between at least a subset of the set of four or more geographical localities, wherein a connection between any two geographical localities indicates a path between the two geographical localities; identify a popularity rating for at least the first geographical locality, wherein the popularity rating for the first geographical locality exceeds the popularity rating for the second geographical locality; receive a request to provide directions from the second geographical locality to the third geographical locality, wherein the directions are specified by one or more paths, each path specified as a sequence of connections; determine that there exist at least two paths from the second geographical locality to the third geographical locality, wherein there does not exist a connection between the second and the third geographical localities, wherein a first path includes the first geographical locality but not the fourth geographical locality and a second path includes the fourth geographical locality but not the first geographical locality; and identify the first path as a preferable path because the popularity rating for the first geographical locality exceeds the popularity rating for the fourth geographical locality, the first path thereby comprising connections from the second geographical locality to the first geographical locality to the third geographical locality.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a table diagram illustrating tables that the disclosed technology may employ in various embodiments.

DETAILED DESCRIPTION

Figure 1A:
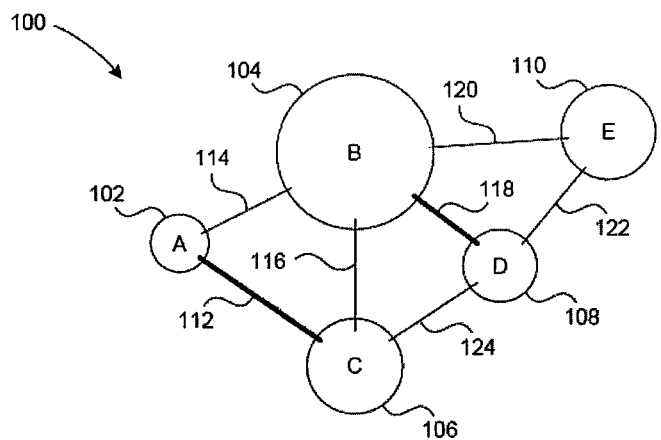
FIGS. 1A-1C are block diagrams illustrating graphs depicting paths through geographical localities.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some geographical areas, people think of directions in terms of geographical localities and connections between the geographical localities. Examples of geographical localities are landmarks, neighborhoods, stores, intersections, religious locations and artifacts, etc. As an example, when providing a direction from an origin to a destination, a person may suggest walking to a popular nearby store, embarking on a bus identified by a bus number, disembarking at a stadium, walking toward a temple, and then walking toward some large signs identifying an upcoming movie or political rally. Some of these geographical localities may not even have a postal address. As an example, a pillar in the middle of the road, a flyover intersection of a major thoroughfare, or a park may not have a postal address.

Technology is described for computing paths between geographical localities ("the technology"). In various embodiments, the technology computes directions using popularity ratings for geographical localities: the more popular a geographical locality is, the more likely it may be included in a path from an origin to a destination when the geographical locality lies on the path from the origin to the destination. As an example, if there are two paths from an origin to a destination, with a first path transiting a more popular geographical locality and a second path transiting a less popular geographical locality, the technology may select the first path. Popular geographical localities will generally be more easily locatable, e.g., by people unfamiliar with the area, because more people will know where the geographical locality is and how to get there. Therefore, travelers may be able to more easily navigate the path, e.g., by asking for directions from others.

The popularity rating for a particular geographical locality can be computed using various means. As examples, the popularity rating can be computed by regularly scanning informational sources, e.g., Internet websites, social networking websites, news sources, etc. Whenever a particular geographical locality is found in informational sources, its popularity rating can be increased. By "crowd-sourcing" the popularity ratings for geographical localities, the technology is able to adapt to changing popularities or popular knowledge of geographical localities. By computing and employing popularity ratings, the technology is able to provide relevant directions to users. As an example, the directions can include a popular movie theater or political rally site one month, but include a new, nearby department store a different month—both for the same origin and destination.

In various embodiments, the technology can take into consideration the desirability of transiting particular connections between geographical localities. Connections can have associated with them importance metrics (or "weights").

As an example, a highway with multiple modes of transportation (e.g., multiple bus routes with frequent buses) may be more desirable (e.g., more "important" or have more "weight") than a winding footpath. On the other hand, a footpath that is a shortcut and substantially reduces the transit time between two geographical localities as compared to traveling on roads may be more desirable than the roads.

In various embodiments, the technology can receive an origin and a list of multiple destinations, and create a path that includes all of the destinations. As an example, the user may desire to visit a grocery store, a doctor, and a pharmacy. The technology can identify popular nearby grocery stores, doctors, and pharmacies, and/or compute a path transiting popular geographical localities. The popularity for the various destinations can be computed in a similar manner to that described above for geographical localities. The computed path may be one that minimizes travel time or distance. The origin may also be a final destination.

In various embodiments, the technology can enable personalization of paths. As an example, the technology may enable the user to provide a set of known geographical localities. A user may know the location of a particular department store, landmark, street, etc. and may be familiar with various paths to that location. When computing a path between an origin and a destination, the technology can scan the set of known geographical localities and attempt to employ them in the path, e.g., when connections exist via the known geographical localities. The technology may ignore the known geographical localities when these localities would take the traveler on a highly circuitous route or significantly increase travel time (e.g., by more than 25%).

Figure 1B:
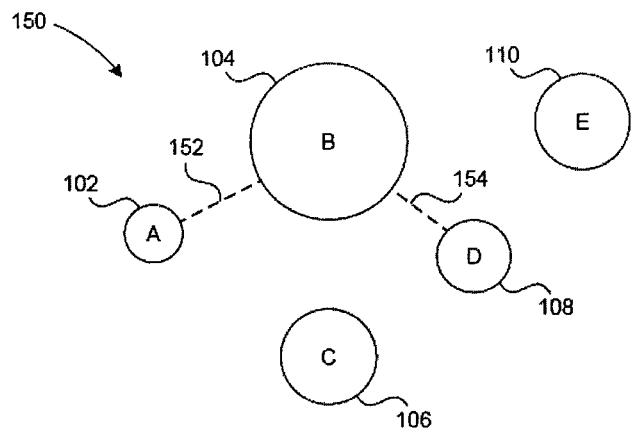
Figure 1C:
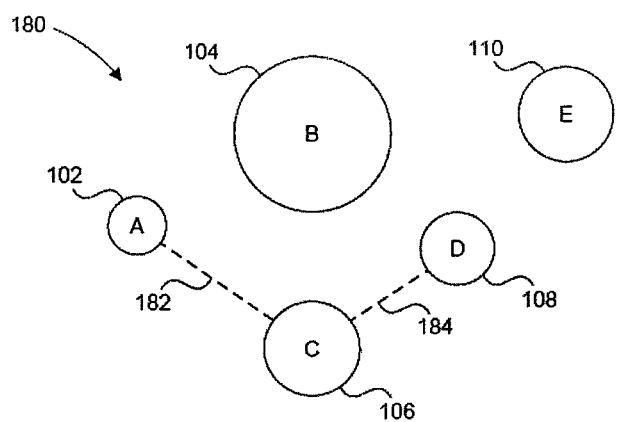

The technology will now be described with reference to the Figures. FIGS. 1A-1C are block diagrams illustrating graphs 100, 150, and 180, respectively, each depicting one or more paths through geographical localities. FIG. 1A depicts a graph 100. The graph 100 includes five geographical localities: A 102, B 104, C 106, D 108, and E 110. The geographical localities are depicted in varying sizes in which a larger size indicates a higher popularity rating. Thus, for example, geographical locality B 104, which is larger than geographical locality C 106, has a higher popularity rating than geographical locality C 106. The graph 100 also includes connections between the geographical localities: a connection 112 between geographical localities A 102 and C 106; a connection 114 between geographical localities A 102 and B 104; a connection 116 between geographical localities B 104 and C 106; a connection 118 between geographical localities B 104 and D 108; a connection 120 between geographical localities B 104 and E 110; a connection 122 between geographical localities D 108 and E 110; and a connection 124 between geographical localities C 106 and D 108. Some connections may be more desirable or "important" than others, e.g., because there may be multiple modes of transportation, frequent public transportation, etc. More important connections can be illustrated by using a thicker line than a less important connection illustrated by using a thinner line. As examples, connections 112 and 118 may be more important than the other connections, as illustrated by the thicker corresponding lines.

FIG. 1B illustrates a graph 150 having a path from geographical locality A 102 via geographical locality B 104 to geographical locality D 108. The selected connections are connections 152 and 154. The technology has selected connections 152 and 154 (corresponding to connections 114 and 118 of FIG. 1A, respectively) because of the higher popularity rating of geographical locality B 104 as compared to geographical locality C 106.

In contrast, FIG. 1C illustrates a graph 180 having a path from geographical locality A 102 via geographical locality C 106 to geographical locality D 108. The selected connections are connections 182 and 184. The technology has selected connections 182 and 184 (corresponding to connections 112 and 124 of FIG. 1A, respectively) because connection 112 is more important (or desirable) than connection 114. In some embodiments, the technology can employ various heuristics to determine whether to give additional weight to the popularity rating of a geographical locality or the importance rating of a connection. As an example, the importance of a connection may be weighted more when the distances are long because a traveler probably wants to spend less time traveling even if it means transiting a less popular geographical locality. Thus, for example, the technology may have selected connections 182 and 184 because the distances between geographical localities A 102 and both B 104 and C 106 are long.

Figure 2:
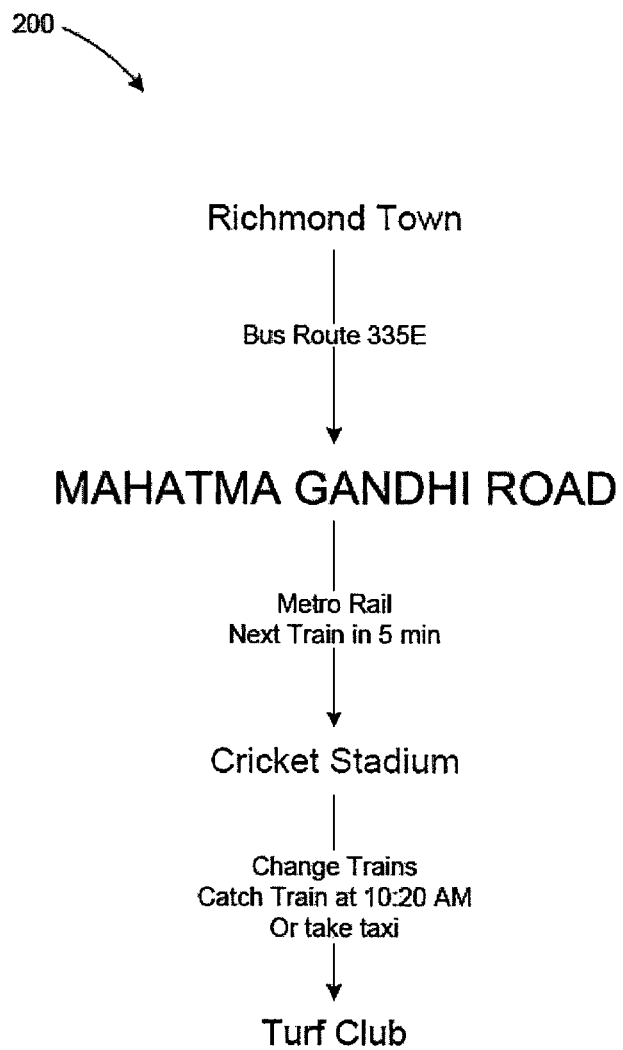
FIG. 2 is a path diagram illustrating a path through a sequence of geographical localities.

FIG. 2 is a path diagram illustrating a path 200 through a sequence of geographical localities. A path 200 is illustrated from Richmond Town to the Turf Club. The path transits a bus route 335E, Mahatma Gandhi Road ("MG Road"), a Metro or rail link, a cricket stadium, and an option to take a train or a taxi. The illustrated path indicates when the next trains are scheduled to arrive. In various embodiments, the technology may display the illustrated path on a screen, transmit step-bystep geographical localities or connections via text messaging, e.g., to a mobile device such as a mobile telephone, or transmit the path via electronic mail. In some embodiments, the technology may provide a "fisheye" view to paths. As an example, the technology may provide more granular directions near an origin or a destination of the path and less granular directions near transitory geographical localities between the origin and destination of the path. By doing so, a user may be able to easily find geographical localities pertinent to the path. By providing more granular directions near an origin or destination, the technology enables a traveler to more easily find the origin or destination. By providing less granular directions between the origin and destination, the technology enables a traveler to employ pertinent geographical localities, e.g., when asking for directions or identifying public transit stops. The technology may automatically sequence through the identified connections and geographical localities, e.g., by monitoring the user's position. As an example, a mobile device that the user is carrying may transmit the user's location and, when the user is at or near a geographical locality or connection forming the path, one or more next geographical localities or connections may be transmitted to the user.

Figure 3:
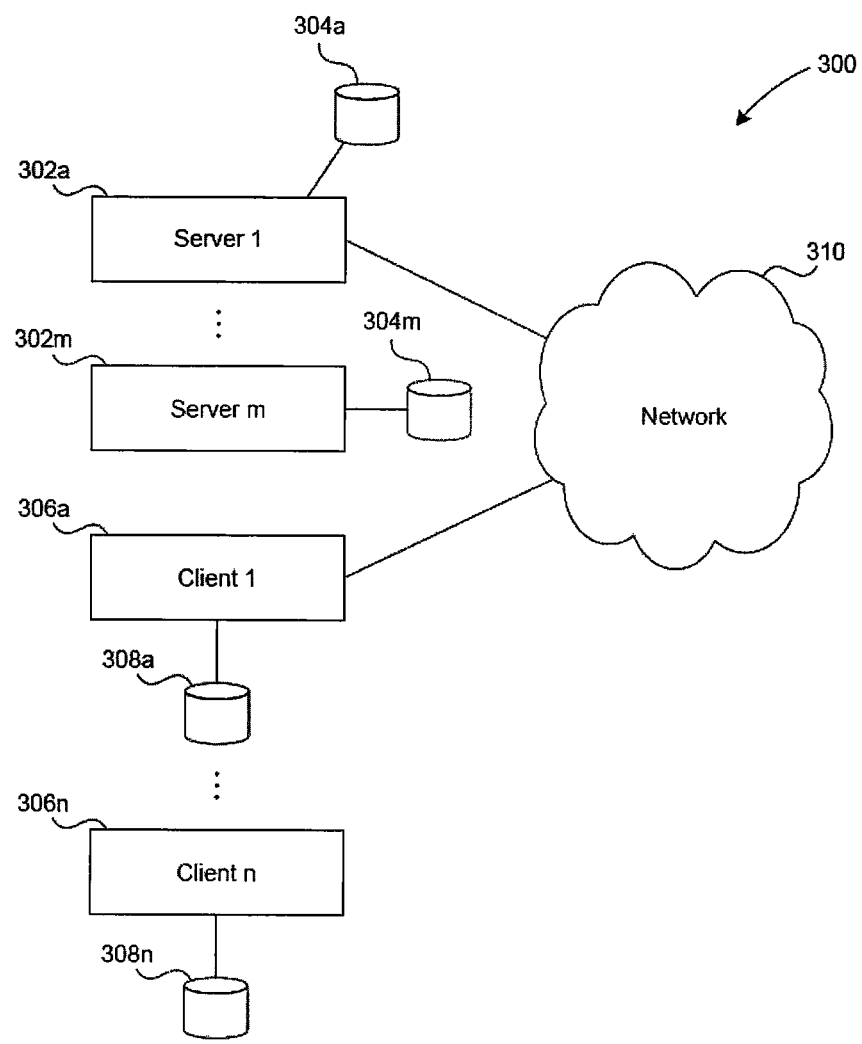
FIG. 3 is a block diagram illustrating components of the disclosed technology in various embodiments.

FIG. 3 is a block diagram illustrating components 300 of the disclosed technology in various embodiments. Components 300 can include one or more server computing devices, e.g., a server 1 302a to a server m 302m. The servers may be communicably coupled with one or more storage devices, e.g., storage devices 304a to 304m. The servers may be communicably coupled with client computing devices, e.g., client computing devices 306a to 306n via a network 310. The network 310 can be an intranet, the Internet, or other type of network. The client computing devices may also be communicably coupled with one or more storage devices, e.g., storage devices 308a to 308n. The storage devices can be used to store data, executable code, etc.

The server computing devices may store various information pertinent to computing paths between geographical localities. As examples, the server computing devices may store geographical localities, popularity ratings, connections, importance or weights of connections, user preferences, and so forth. The server computing devices may respond to client requests, e.g. client requests that arrive via the Internet, text messaging (e.g., SMS), etc.

The client computing devices may transmit path requests and/or locality information to server computing devices, and may display paths. Examples of client computing devices are personal computers, mobile computers, personal digital assistants, smart phones, etc.

FIG. 4 is a table diagram illustrating tables 400 and 420 that the disclosed technology may employ in various embodiments. The technology may employ table 400 to store popularity ratings for geographical localities. As depicted, table 400 includes an ID column 402, a geographical locality column 404, and a popularity rating column 406. The table can store popularity ratings for one or more geographical localities. As examples, a row 408 corresponding to geographical locality A stores a popularity rating of 5; a row 410 corresponding to geographical locality B stores a popularity rating of 25; a row 412 corresponding to geographical locality C stores a popularity rating of 10; a row 414 corresponding to geographical locality D stores a popularity rating of 7; and a row 416 corresponding to geographical locality E stores a popularity rating of 15.

The technology may employ table 420 to store weights (e.g., importance ratings) corresponding to connections. As depicted, table 420 includes an ID column 422, a geographical locality column 424, a connected locality column 426, and a weight column 428. The table can store weights for one or more connections. As examples, a row 428 corresponding to a connection between geographical localities A and B has no weight; a row 430 corresponding to a connection between geographical localities A and C has a weight of 15; a row 432 corresponding to a connection between geographical localities B and C has a weight of 2; a row 434 corresponding to a connection between geographical localities B. and D. has a weight of 15; and a row 436 corresponding to a connection between geographical localities B and E has a weight of 3.

Although FIG. 4 illustrates tables whose contents and organization are designed to make them more comprehensible by a human reader, those skilled in the art will appreciate that actual data structures used by the facility to store this information may differ from the tables shown, in that they, for example, may be organized in a different manner; may contain more or less information than shown; may be compressed and/or encrypted; etc. In various embodiments, the technology may have more tables than are illustrated in FIG. 4.

Figure 5:
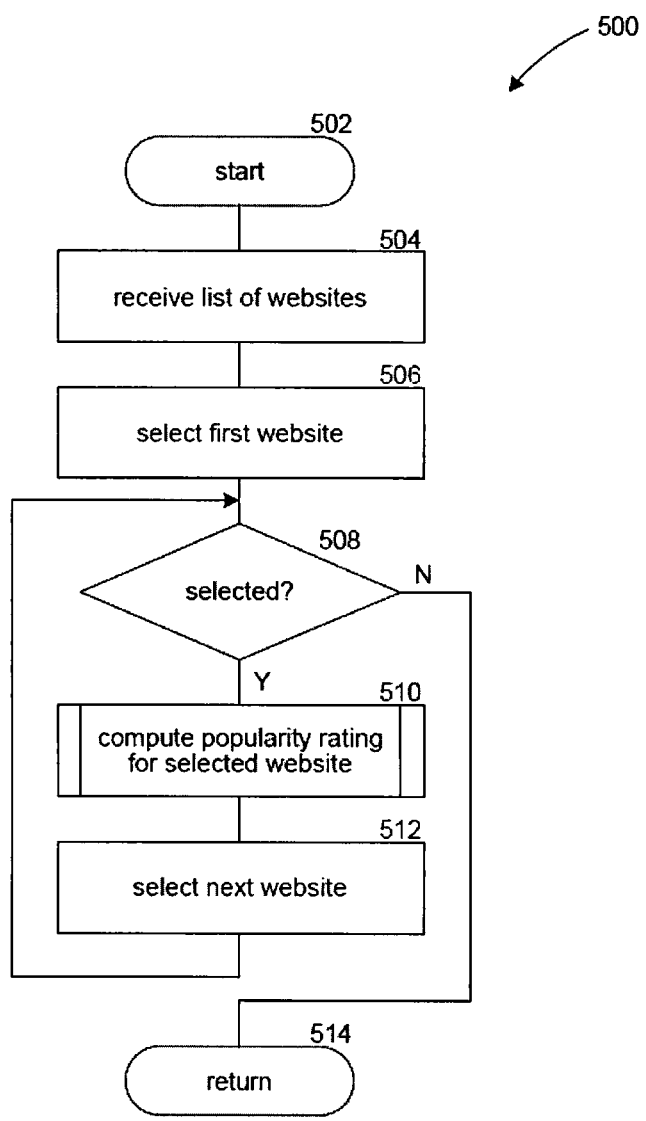
FIG. 5 is a flow diagram illustrating a routine for collecting popularity ratings for multiple websites that the disclosed technology may invoke in various embodiments.

FIG. 5 is a flow diagram illustrating a routine 500 for collecting popularity ratings for multiple websites that the disclosed technology may invoke in various embodiments. Routine 500 begins at block 502. The routine continues at block 504. At block 504, the routine receives a list of websites. In various embodiments, the routine may employ a database of known websites or relevant websites. The routine continues at block 506. At block 506, the routine selects the first website. The routine continues at decision block 508. If, at decision block 508, the routine determines that a website is selected, the routine continues at block 510. Otherwise, the routine returns at block 514. At block 510, the routine invokes a subroutine for computing a popularity rating for the selected website. This subroutine is described in further detail below in relation to FIG. 6. The routine then continues at block 512 where it selects the next website. The routine then continues at decision block 508. Thus, a loop of blocks 508, 510, and 512 can iterate through multiple websites. In various embodiments, the routine may select a subset of the list of websites to process periodically, e.g., nightly.

Those skilled in the art will appreciate that the logic illustrated in FIG. 5 and described above, and in each of the flow diagrams discussed below, may be altered in a variety of ways. For example, the order of the logic may be rearranged, sublogic may be performed in parallel, illustrated logic may be omitted, other logic may be included, etc.

Figure 6:
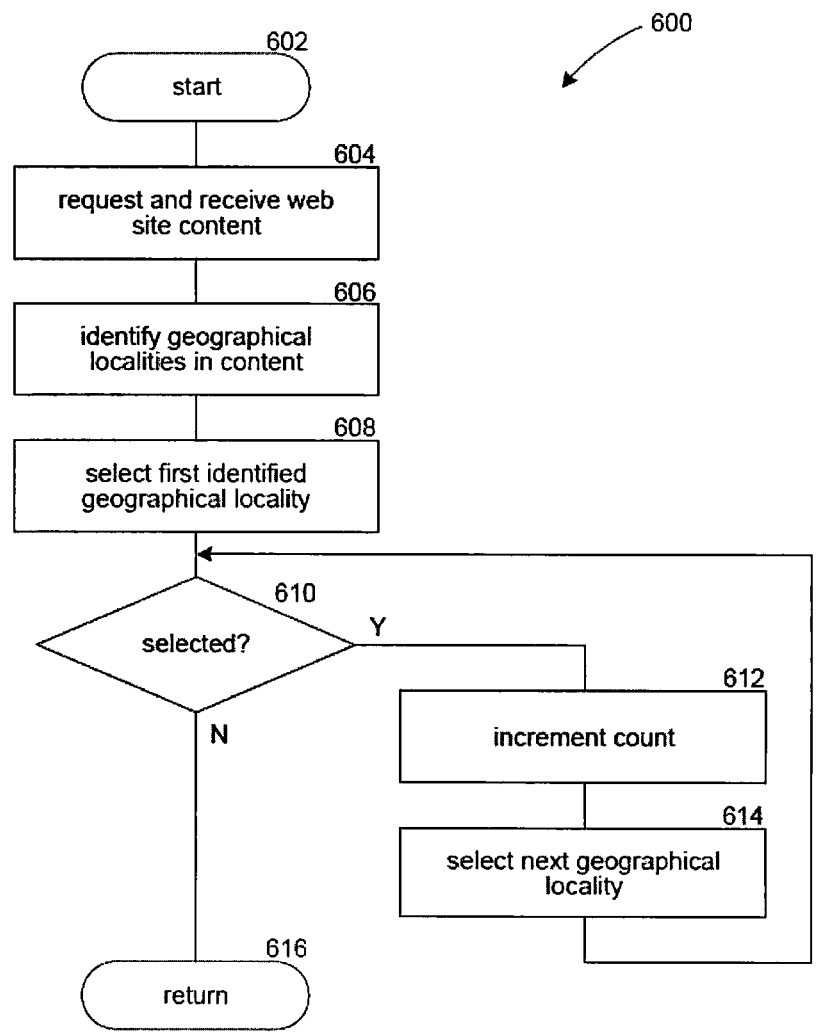
FIG. 6 is a flow diagram illustrating a routine for computing a popularity rating for a geographical locality based on website content that the disclosed technology may invoke in various embodiments.

FIG. 6 is a flow diagram illustrating a routine 600 for computing a popularity rating for a geographical locality based on website content that the disclosed technology may invoke in various embodiments. Routine 600 begins at block 602. The routine continues at block 604.

At block 604, the routine requests and receives website content. In various embodiments, the routine may receive a link to the website content (e.g., a uniform resource locator or "URL") or may receive previously downloaded website content. If the routine receives a link to the website content, it may download the website content identified by the link. The routine continues at block 606.

At block 606, the routine identifies geographical localities contained in the website content. As an example, the routine may employ a list of known geographical localities and search the website content for geographical localities from the list. In some embodiments, the routine may be capable of identifying geographical localities in the website content based on textual or semantic information contained in the website content. As an example, the routine may recognize that some text in the website content refers to an address or other location. The routine continues at block 608.

At block 608, the routine selects a first geographical locality identified in the website content. The routine continues at decision block 610. At decision block 610, the routine determines whether a geographical locality was selected. If a geographical locality was selected, the routine continues at block 612. Otherwise, the routine returns at block 616. At block 612, the routine increments a count, e.g., a counter for a popularity rating of the identified geographical locality. The higher the count, the more popular the selected geographical locality may be. The routine continues at block 614. At block 614, the routine selects a next geographical locality. The routine then continues at decision block 610. Thus, in the loop of blocks 610, 612, and 614, the routine iterates through at least some of the geographical localities identified in the website content.

In various embodiments, the technology may employ or identify popularized names. As an example, when a new structure appears on or near an area previously known by a different name, the technology can readily adapt to the new name popularly employed even though maps may identify the area by its previous name. Thus, by computing popularity ratings based on content stored at websites, the technology is able to provide paths identifying geographical localities that travelers may be familiar with.

Figure 7:
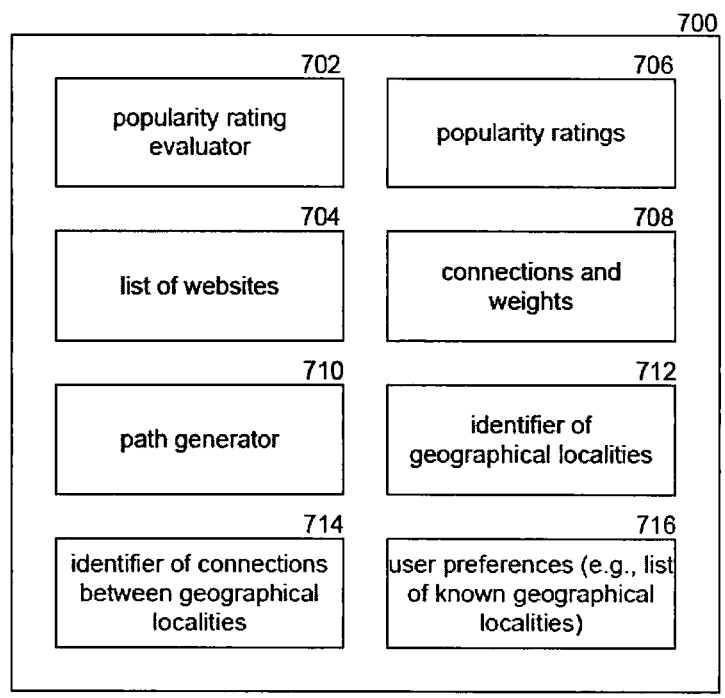
FIG. 7 is a block diagram illustrating components of the disclosed technology in various embodiments.

FIG. 7 is a block diagram illustrating components 700 of the disclosed technology in various embodiments. Components 700 can include a popularity rating evaluator 702, a list of websites 704, popularity ratings 706, connections and weights 708, a path generator 710, an identifier of geographical localities 712, an identifier of connections between geographical localities 714, and user preferences (e.g., a list of geographical localities known to a user) 716.

Popularity rating evaluator component 702 can evaluate popularity ratings for geographical localities. As an example, popularity rating evaluator component 702 may implement the routine illustrated and described above in relation to FIG. 6. List of websites component 704 may provide a list of websites that the technology is to evaluate to determine the popularity of geographical localities. Popularity ratings component 706 may store popularity ratings for one or more geographical localities. Connections and weights component 708 may store a list of connections between geographical localities and weights for one or more of the stored connections. The weights may indicate an importance or desirability of a particular connection. Path generator component 710 may generate a path between any two geographical localities. The technology may employ identifier of geographical localities component 712 to identify geographical localities in downloaded website content. The technology may employ identifier of connections between geographical localities component 714 to identify connections between geographical localities. As an example, component 714 may identify commonly navigated connections but not other connections. User preferences component 716 may store user preferences, e.g., a list of geographical localities that a user prefers to transit whenever possible.

Figure 8:
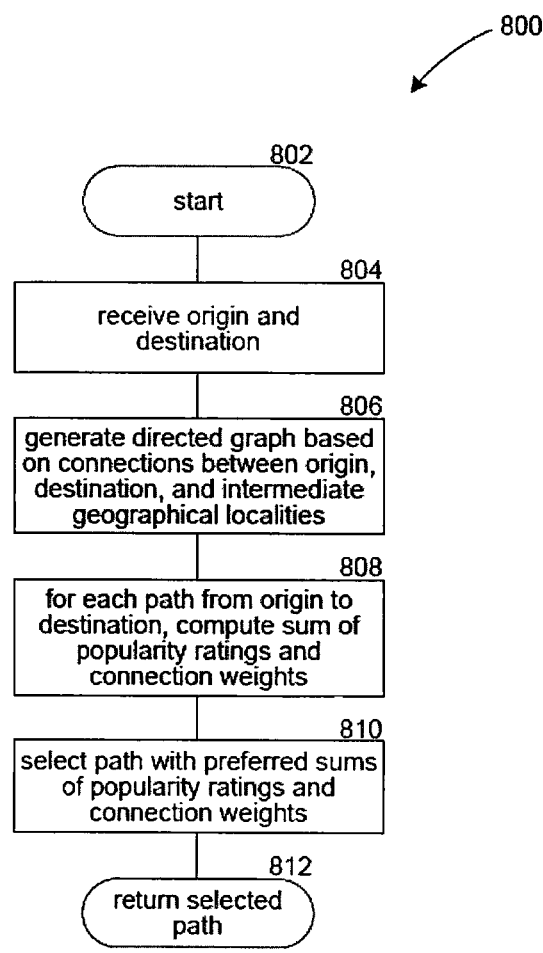
FIG. 8 is a flow diagram illustrating a routine for computing a path from an origin to a destination that the disclosed technology may invoke in various embodiments.

FIG. 8 is a flow diagram 800 illustrating a routine for computing a path from an origin to a destination that the disclosed technology may invoke in various embodiments. Routine 800 begins at block 802. The routine continues at block 804. At block 804, the routine receives an indication of an origin and a destination. The origin and the destination may be geographical localities. The routine continues at block 806.

At block 806, the routine generates a graph (e.g., a directed graph) based on connections between the origin and destination, and intermediate geographical localities. The intermediate geographical localities are geographical localities that have connections between each other and/or the origin or the destination. Various techniques are known in the art for generating a subset of known points between any two given points, e.g., from a list or database of known points. The routine continues at block 808.

At block 808, the routine computes a sum of popularity ratings and connection weights for each path from the origin to the destination. In some embodiments, the routine may perform this computation for a selected subset of the paths from the origin to the destination. The routine continues at block 810.

At block 810, the routine selects the path having a preferred (e.g., optimal) sums of popularity ratings and connection weights. In various embodiments, the routine may employ various algorithms or heuristics to provide additional importance or less importance to the computed sum of popularity ratings or connection weights. As an example, the routine may provide more importance to connection weights when the distance between two geographical localities is long.

In various embodiments, the technology may employ Dijkstra's algorithm, which is a well-known algorithm in the art for computing a path between any two points in a graph. In other embodiments, the technology may employ other known algorithms, e.g., Bellman-Ford algorithm, breadth-first search, depth-first search, Euclidean shortest path algorithm, Floyd-Warshall algorithm, etc.

The routine continues at block 812, where the routine returns the selected path.

Figure 9A:
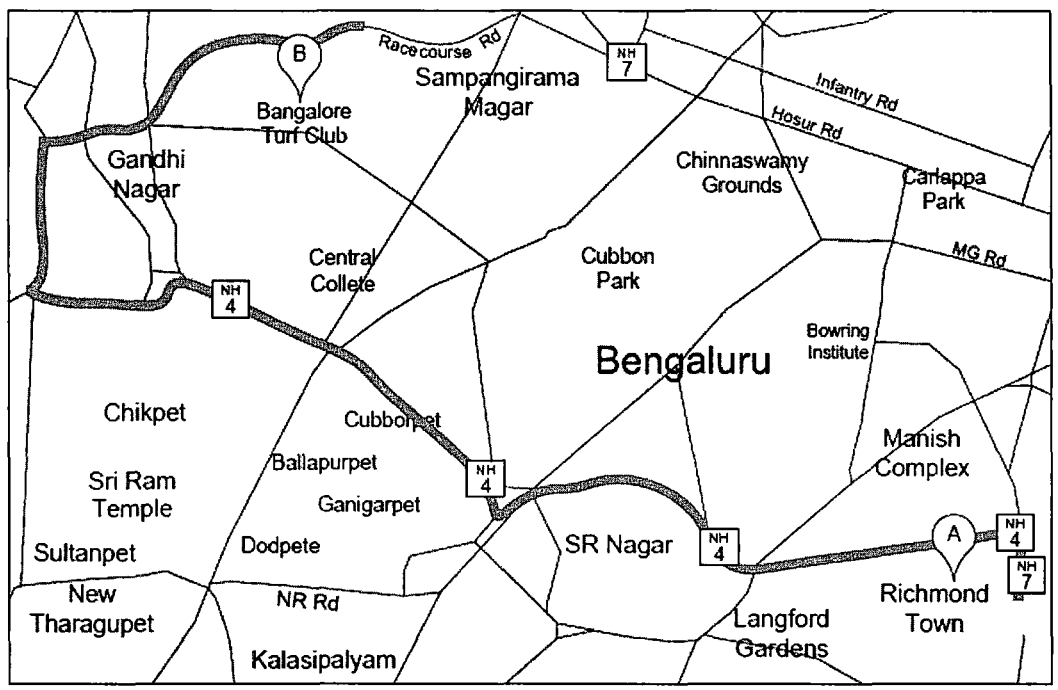
FIG. 9A is a map diagram illustrating a map of a geographical area.

FIG. 9A is a map diagram illustrating a map of a geographical area. The map includes various roads and geographical localities. Examples of geographical localities depicted on the map are Richmond Town, Langford Gardens, Gandhi Nagar, and Bangalore Turf Club. In the following example, a traveler desires to travel from Richmond Town (the origin is indicated as an "A" in a bubble) to Bangalore Turf Club (the destination is indicated as a "B" in a bubble).

Figure 9B:
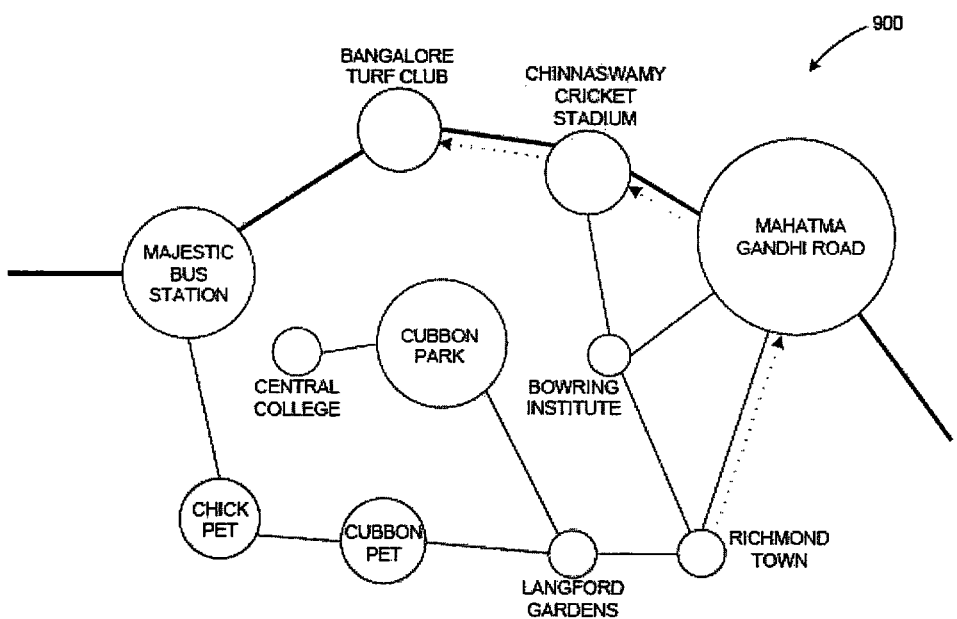
FIG. 9B is a graph diagram illustrating a graph of geographical localities corresponding to the geographical area illustrated in FIG. 9A.

FIG. 9B is a graph diagram illustrating a graph 900 of geographical localities corresponding to the geographical area illustrated in FIG. 9A. Graph 900 is similar to the graphs of FIGS. 1A-1C in that geographical localities and connections between the geographical localities are depicted, with the size of the geographical locality corresponding to the popularity rating of the geographical locality. A dotted line depicts the path the technology has identified for the traveler to travel from Richmond Town to Bangalore Turf Club: transiting Mahatma Gandhi Road ("MG Road" on the map of FIG. 9A) and Chinnaswamy Cricket Stadium (on or near Chinnaswamy Grounds on the map, but derived stadium name from website content that is more popularly employed).

Figure 9C:
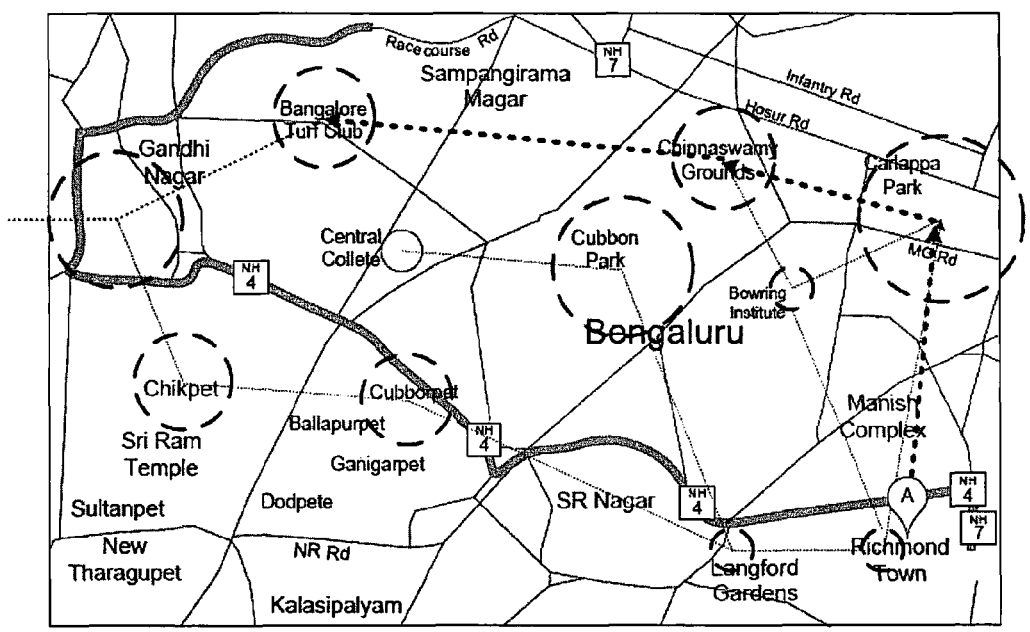
FIG. 9C is a map diagram with the graph diagram of FIG. 9B superimposed on it.

FIG. 9C is a map diagram with the graph diagram of FIG. 9B superimposed on it. The superimposed image may be rendered (e.g., on a screen) so that the user can easily navigate from point to point. In various embodiments, the technology can also render the maps and graphs of FIGS. 9A and 9B, e.g., on a screen, so that the user can easily navigate from point to point.

Figure 10:
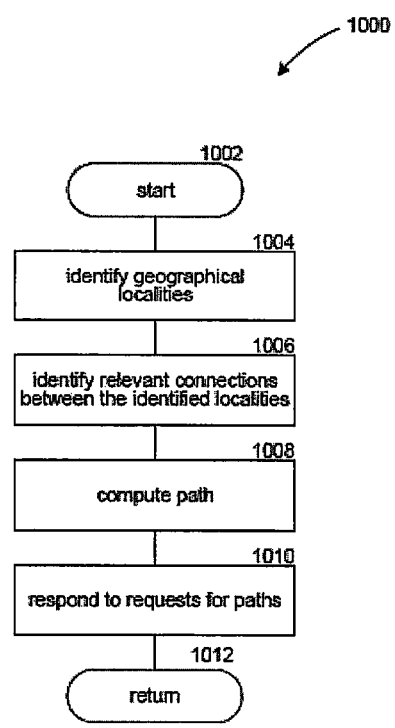
FIG. 10 is a flow diagram illustrating a routine for responding to requests for paths between origins and destinations that the disclosed technology may invoke in various embodiments.

FIG. 10 is a flow diagram illustrating a routine 1000 for responding to requests for paths between origins and destinations that the disclosed technology may invoke in various embodiments. Routine 1000 begins at block 1002. The routine may receive an origin and destination. In some embodiments, the routine may receive an origin, one or more other geographical localities that the user desires to visit, and a destination. The routine continues at block 1004. At block 1004, the routine identifies geographical localities, e.g., by querying a list or database of geographical localities for geographical localities near or between the origin and the destination. The routine continues at block 1006. At block 1006, the routine identifies relevant connections between the identified localities. As an example, the routine may identify relevant connections by employing the subroutine illustrated in FIG. 11 and described below in relation to FIG. 11. In other embodiments, the routine may employ other methods to select relevant connections (e.g., based on user preferences) or some combination of both. The routine continues at block 1008. At block 1008, the routine computes a path, e.g., from the origin to the destination, and optionally via the other geographical localities that the user has indicated. The routine continues at block 1010. At block 1010, the routine responds to the requests for paths, e.g., by displaying a path or returning path information. The routine then continues at block 1012, where the routine returns.

Figure 11:
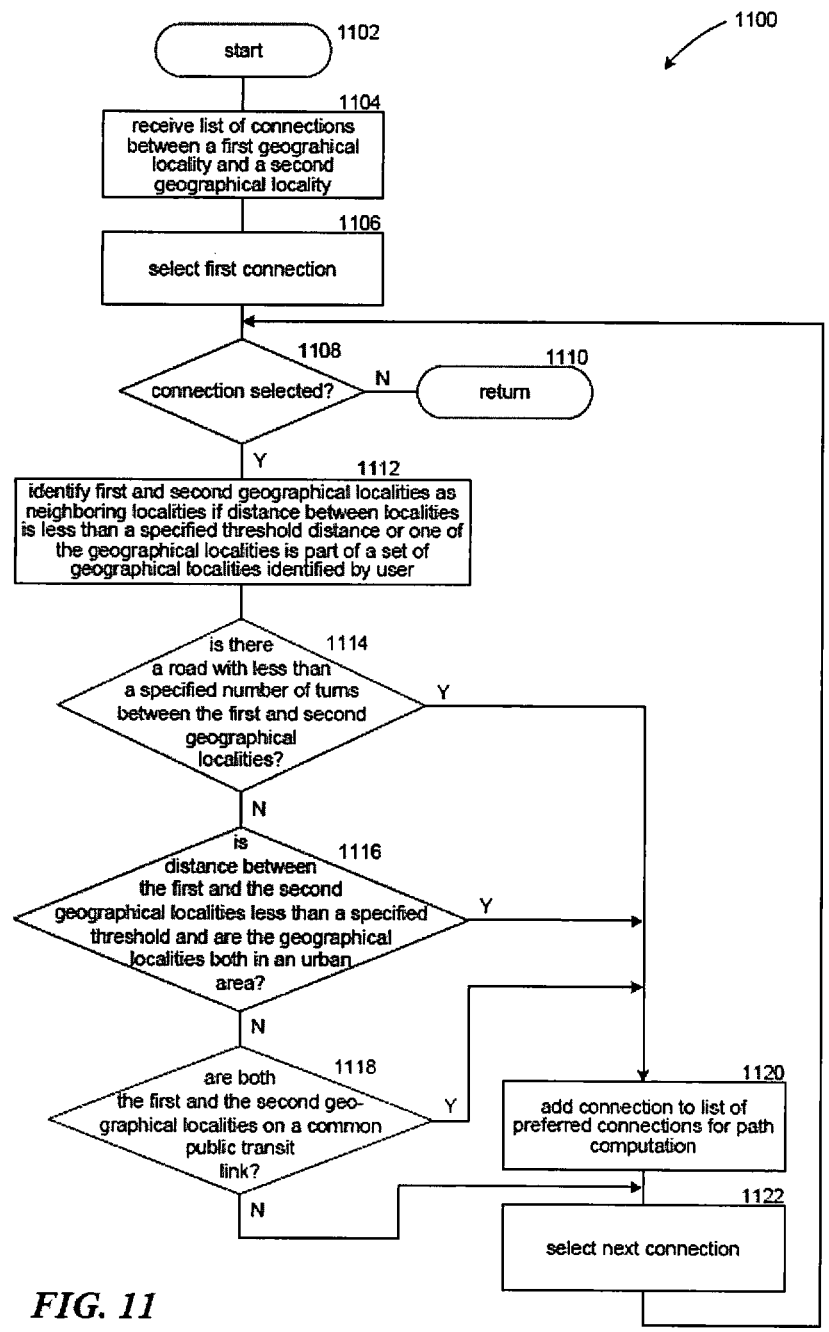
FIG. 11 is a flow diagram illustrating a routine for identifying connections between geographical localities that may be suitable for use in paths that the disclosed technology may invoke in various embodiments.

FIG. 11 is a flow diagram illustrating a routine 1100 for identifying connections between geographical localities that may be suitable for use in paths that the disclosed technology may invoke in various embodiments. Routine 1100 begins at block 1102. The routine continues at block 1104. At block 1104, the routine receives a list of connections between the first geographical locality and the second geographical locality. The routine continues at block 1106. At block 1106, the routine selects the first connection. The routine continues at decision block 1108. If, at decision block 1108, the routine determines that a connection has been selected, the routine continues at block 1112. Otherwise, the routine returns at block 1110. At block 1112, the routine identifies a first and a second geographical localities as neighboring geographical localities if the distance between the first and the second geographical localities is less than a specified threshold distance or if one of the geographical localities is part of a set of geographical localities that are identified by the user. The routine continues at decision block 1114. At decision block 1114, the routine determines whether there is a road with less than a specified number of turns between the first and second geographical localities. If that is the case, the routine continues at block 1120. Otherwise, the routine continues at decision block 1116. At decision block 1116, the routine determines whether the distance between the first and the second geographical localities is less than a specified threshold and whether both geographical localities are in urban areas. If that is the case, the routine continues at block 1120. Otherwise, the routine continues at decision block 1118. At decision block 1118, the routine determines whether both the first and the second geographical localities are on a common public transit link. If that is the case, the routine continues at block 1120. Otherwise, the routine continues at block 1122. At block 1120, the routine adds the connection to the list of referred connections for computation of paths. The routine continues at block 1122. At block 1122, the routine selects the next connection in the list of connections. The routine then continues at decision block 1108. Thus, the routine iterates through the connections and identifies connections that may be suitable for inclusion (e.g., relevant for use) in paths.

Figure 12:
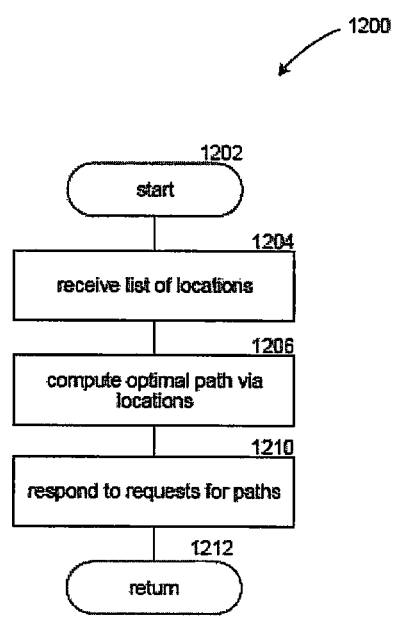
FIG. 12 is a flow diagram illustrating a routine for responding to requests for paths between multiple locations that the disclosed technology may invoke in various embodiments.

FIG. 12 is a flow diagram illustrating a routine 1200 for responding to requests for paths between multiple locations that the disclosed technology may invoke in various embodiments. Routine 1200 begins at block 1202. The routine continues at block 1204. At block 1204, the routine receives a list of locations. As an example, the routine may receive an origin, a destination, and one or more other geographical localities. As an example, the routine may receive a list of stores, offices, or other locations the user desires to visit. The routine continues at block 1206. At block 1206, the routine computes a path (e.g., an "optimal" path) via the received list of locations. The technology can use the routines described above for computation of paths between any two geographical localities. As an example, the routine may compute an optimal path that minimizes the amount of time or distance traveled. The routine continues at block 1210. At block 1210, the routine responds to the requests for paths, e.g., by returning the computed paths. The routine then continues at block 1212, where the routine returns.

Figure 13:
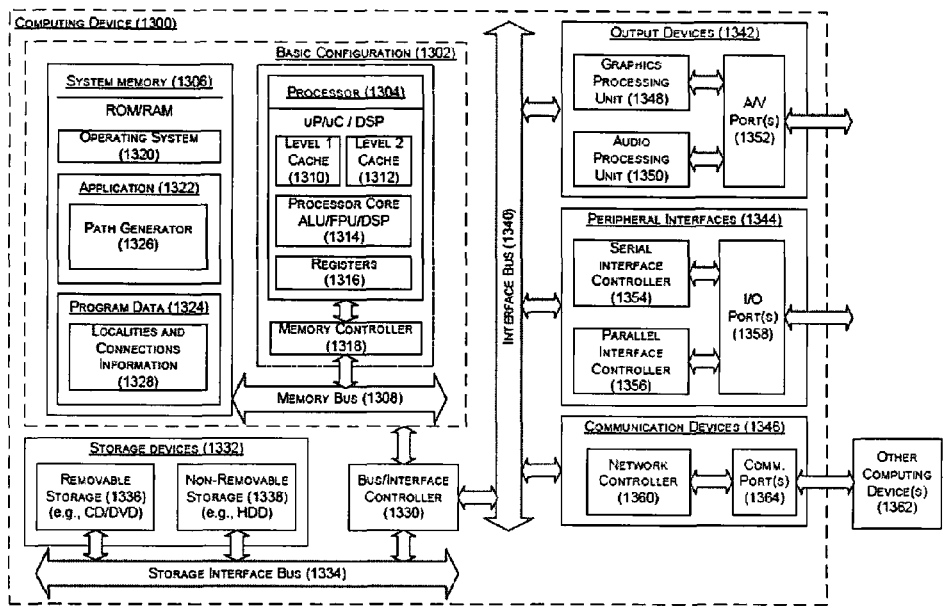
FIG. 13 is a block diagram of an illustrative embodiment of a computing device that is arranged for computing paths between geographical localities in accordance with at least some embodiments of the present disclosure.

FIG. 13 is a block diagram illustrating an example computing device 1300 that is arranged for disabling a rotation function in accordance with at least some embodiments of the present disclosure. In a very basic configuration 1302, computing device 1300 typically includes one or more processors 1304 and a system memory 1306. A memory bus 1308 may be used for communicating between processor 1304 and system memory 1306.

Depending on the desired configuration, processor 1304 may be of any type including but not limited to a microprocessor (μP), a microcontroller (μC), a digital signal processor (DSP), or any combination thereof. Processor 1304 may include one more levels of caching, such as a level one cache 1310 and a level two cache 1312, a processor core 1314, and registers 1316. An example processor core 1314 may include an arithmetic logic unit (ALU), a floating point unit (FPU), a digital signal processing core (DSP Core), or any combination thereof. An example memory controller 1318 may also be used with processor 1304, or in some implementations memory controller 1318 may be an internal part of processor 1304.

Depending on the desired configuration, system memory 1306 may be of any type including but not limited to volatile memory (such as RAM), non-volatile memory (such as ROM, flash memory, etc.) or any combination thereof. System memory 1306 may include an operating system 1320, one or more applications 1322, and program data 1324. Application 1322 may include a path generator component 1326 that is arranged to generate paths. Program data 1324 may include geographical localities and connections information 1328 that may be useful for generating paths, as is described herein. In some embodiments, application 1322 may be arranged to operate with program data 1324 on operating system 1320 such that rotation of displayed information is enabled or disabled, e.g., depending on an orientation of the display. This described basic configuration 1302 is illustrated in FIG. 13 by those components within the inner dashed line.

Computing device 1300 may have additional features or functionality, and additional interfaces to facilitate communications between basic configuration 1302 and any required devices and interfaces. For example, a bus/interface controller 1330 may be used to facilitate communications between basic configuration 1302 and one or more data storage devices 1332 via a storage interface bus 1334. Data storage devices 1332 may be removable storage devices 1336, non-removable storage devices 1338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1306, removable storage devices 1336 and non-removable storage devices 1338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1300. Any such computer storage media may be part of computing device 1300.

Computing device 1300 may also include an interface bus 1340 for facilitating communication from various interface devices (e.g., output devices 1342, peripheral interfaces 1344, and communication devices 1346) to basic configuration 1302 via bus/interface controller 1330. Example output devices 1342 include a graphics processing unit 1348 and an audio processing unit 1350, which may be configured to communicate to various external devices such as a display or speakers via one or more A/V ports 1352. Example peripheral interfaces 1344 include a serial interface controller 1354 or a parallel interface controller 1356, which may be configured to communicate with external devices such as input devices (e.g., keyboard, mouse, pen, voice input device, touch input device, etc.) or other peripheral devices (e.g., printer, scanner, etc.) via one or more I/O ports 1358. An example communication device 1346 includes a network controller 1360, which may be arranged to facilitate communications with one or more other computing devices 1362 over a network communication link via one or more communication ports 1364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1300 may also be implemented as a personal computer including both laptop computer and non-laptop computer configurations.

In various embodiments, the technology computes paths inside various types of geographical locations, e.g., university campuses, corporate campuses, shopping malls, etc. In these embodiments, the technology may limit its searches for geographical localities to those geographical localities contained in the geographical locations. As an example, for a shopping mall, the technology may search for particular stores, facilities, etc. For University campuses, the technology may search for particular university buildings, fountains, or other landmarks. Thus, the technology is not limited to cities and towns or geographical localities therein.

Figure 14:
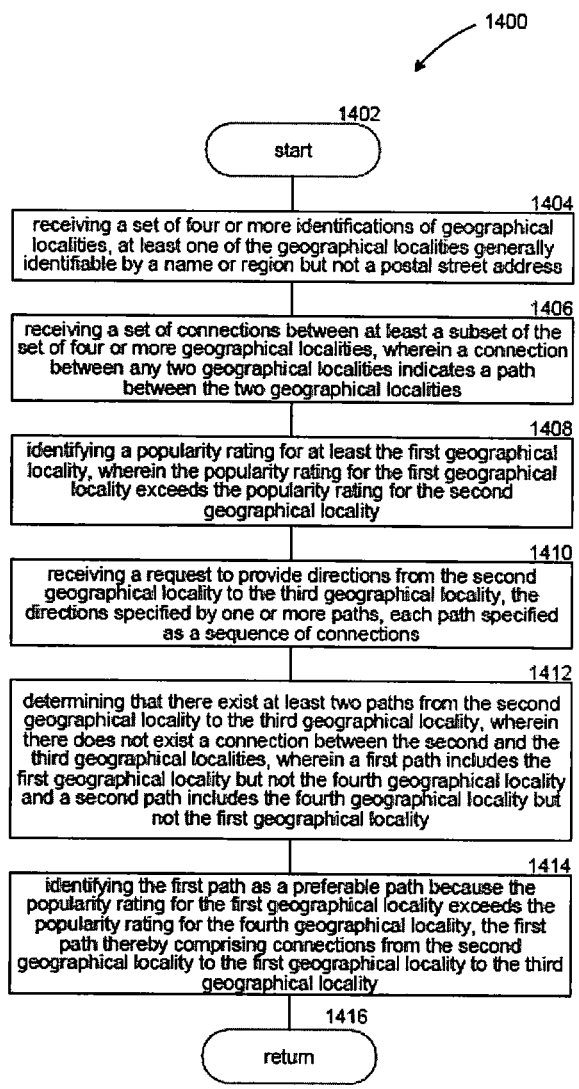
FIG. 14 is a flow diagram illustrating a routine for computing a path that the disclosed technology may invoke in various embodiments.

FIG. 14 is a flow diagram illustrating a routine for computing a path that the disclosed technology may invoke in various embodiments. In various embodiments, the technology implements a method 1400 performed by a computing system having a processor and a memory device, comprising: receiving a set of four or more identifications of geographical localities, at least one of the geographical localities generally identifiable by a name or region but not a postal street address 1404; receiving a set of connections between at least a subset of the set of four or more geographical localities, wherein a connection between any two geographical localities indicates a path between the two geographical localities 1406; identifying a popularity rating for at least the first geographical locality, wherein the popularity rating for the first geographical locality exceeds the popularity rating for the second geographical locality 1408; receiving a request to provide directions from the second geographical locality to the third geographical locality, the directions specified by one or more paths, each path specified as a sequence of connections 1410; determining that there exist at least two paths from the second geographical locality to the third geographical locality, wherein there does not exist a connection between the second and the third geographical localities, wherein a first path includes the first geographical locality but not the fourth geographical locality and a second path includes the fourth geographical locality but not the first geographical locality 1412; and identifying the first path as a preferable path because the popularity rating for the first geographical locality exceeds the popularity rating for the fourth geographical locality, the first path thereby comprising connections from the second geographical locality to the first geographical locality to the third geographical locality 1414. The routine begins at block 1402 and then continues at block 1404; followed by 1406; followed by 1408; followed by 1410; followed by 1412; followed by 1414; and returns to block 1416.

The method can further comprise receiving a set of multiple connections between the first geographical locality and the second geographical locality. The method can further comprise comprising receiving a set of multiple connections between the fourth geographical locality and the second geographical locality, but selecting the first geographical locality because of its popularity rating. The method can further comprise causing the first path to be rendered. The first path can be rendered as a schematic diagram or as a graph. The rendered vertices of the graph can be varied in size based on their relative popularity rating and/or the rendered edges of the graph can be varied in thickness based on their relative importance. A first connection can be more important than a second connection if the first connection has more travel volume than the second connection. The rendering can be more detailed near the second and the third geographical localities than near the first or the fourth geographical localities. The first path can be rendered as a list of geographical localities.

The method can further comprise rendering an item in the list corresponding to a next geographical locality differently than an item in the list corresponding to a different geographical locality. The method can further comprise identifying a popularity rating for at least the first geographical locality comprises analyzing content at one or more websites. The popularity rating can be a function of a number of web pages having content identifying one or more of the geographical localities. The popularity rating can be a function of page ranks of web pages having content identifying one or more of the geographical localities. Identifying a popularity rating for at least the first geographical locality can comprise analyzing content at one or more social networking sites. The method can further comprise generating a graph wherein vertices of the graph represent geographical localities and edges of the graph represent the connections. The method can further comprise generating a response to the received request by employing a computational solution for solving a directed graph problem. At least one of the connections can be one of a railway, road, bus route, or pedestrian path. Receiving a set of connections can comprise employing a connection if it is a relatively straight road. Receiving a set of connections can comprise employing a connection if it connects two geographical localities that are separated by fewer than approximately 250 meters. Receiving a set of connections can comprise employing a connection if it connects two geographical localities that are on a same public transit route. The method can further comprise receiving an automatically sensed present location of a user from whom the request was received. The popularity rating can be based on a user's indicated preference.

In various embodiments, the technology employs one or more computer-readable memory devices storing instructions, the instructions comprising: receiving a set of four or more identifications of geographical localities, at least one of the localities generally identifiable by a name or region; receiving a set of connections between at least a subset of the set of four or more geographical localities wherein the connections between any two geographical localities indicates a path between the two geographical localities; receiving a popularity rating for at least the first and the fourth geographical localities, wherein the popularity rating for the first geographical locality exceeds the popularity rating for the fourth geographical locality; receiving a request to provide directions from the second geographical locality to the third geographical locality; determining that there exist at least two paths from the second geographical locality to the third geographical locality, wherein there does not exist a connection between the second and the third geographical localities, wherein a first path includes the first geographical locality and a second path includes the fourth geographical locality; and identifying the first path as a preferable path because the popularity rating for the first geographical locality exceeds the popularity rating for the fourth geographical locality.

Figure 15:
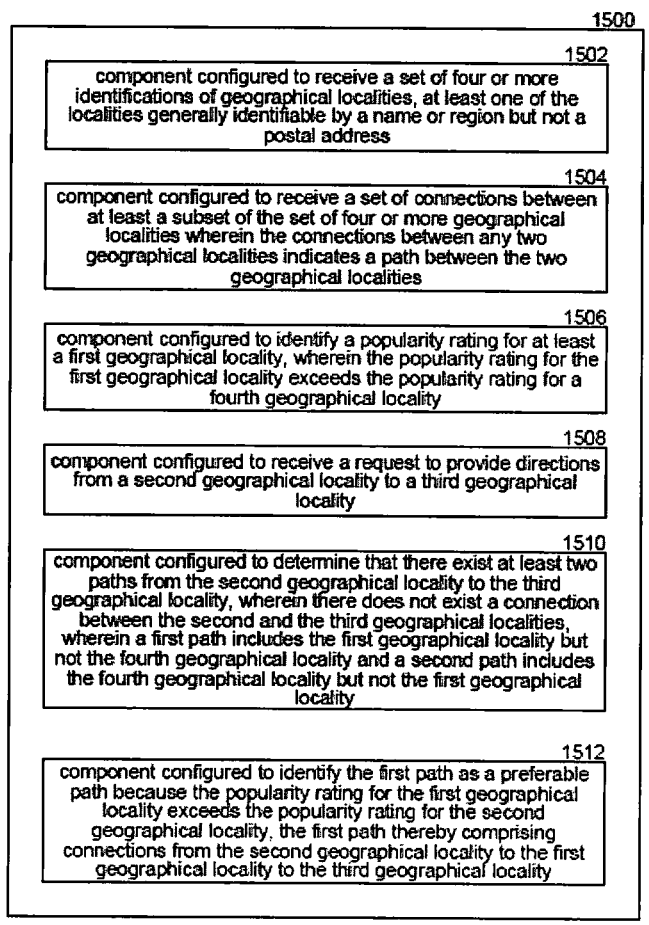
FIG. 15 is a block diagram illustrating components of the technology in various embodiments.

FIG. 15 is a block diagram illustrating components of the technology in various embodiments. In various embodiments, the technology implements a system 1500 comprising a component configured to receive a set of four or more identifications of geographical localities, at least one of the localities generally identifiable by a name or region but not a postal address 1502; a component configured to receive a set of connections between at least a subset of the set of four or more geographical localities wherein the connections between any two geographical localities indicates a path between the two geographical localities 1504; a component configured to identify a popularity rating for at least a first geographical locality, wherein the popularity rating for the first geographical locality exceeds the popularity rating for a fourth geographical locality 1506; a component configured to receive a request to provide directions from a second geographical locality to a third geographical locality 1508; a component configured to determine that there exist at least two paths from the second geographical locality to the third geographical locality, wherein there does not exist a connection between the second and the third geographical localities, wherein a first path includes the first geographical locality but not the fourth geographical locality and a second path includes the fourth geographical locality but not the first geographical locality 1510; and a component configured to identify the first path as a preferable path because the popularity rating for the first geographical locality exceeds the popularity rating for the second geographical locality, the first path thereby comprising connections from the second geographical locality to the first geographical locality to the third geographical locality 1512. The system can further comprise a component configured to receive from a user a fifth identification of a geographical locality and can include the fifth geographical locality in the preferable path.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system having a processor and a memory device, comprising:
 receiving a set of four or more identifications of geographical localities, at least one of the geographical localities generally identifiable by a name or region but not a postal street address;
 receiving a set of connections between at least a subset of the set of four or more geographical localities, wherein a connection between any two geographical localities indicates a path between the two geographical localities;
 identifying a popularity rating for at least a first geographical locality, wherein the popularity rating for the first geographical locality exceeds the popularity rating for a second geographical locality;
 receiving a request to provide directions from the second geographical locality to a third geographical locality, the directions specified by one or more paths, each path specified as a sequence of connections;
 determining by the processor that there exist at least two paths from the second geographical locality to the third geographical locality, wherein there does not exist a connection between the second and the third geographical localities, wherein a first path includes the first geographical locality but not a fourth geographical locality and a second path includes the fourth geographical locality but not the first geographical locality; and
 identifying the first path as a preferable path because the popularity rating for the first geographical locality exceeds the popularity rating for the fourth geographical locality, the first path thereby comprising connections from the second geographical locality to the first geographical locality to the third geographical locality.

2. The method of claim 1 further comprising receiving a set of multiple connections between the first geographical locality and the second geographical locality.

3. The method of claim 1 further comprising receiving a set of multiple connections between the fourth geographical locality and the second geographical locality, but selecting the first geographical locality because of a popularity rating associated with the first geographical locality.

4. The method of claim 3 further comprising causing the first path to be rendered.

5. The method of claim 4 wherein the first path is rendered as a schematic diagram.

6. The method of claim 4 wherein the first path is rendered as a graph.

7. The method of claim 6 wherein the first path is rendered as a graph, wherein rendered vertices are varied in size based on their relative popularity rating.

8. The method of claim 6 wherein the first path is rendered as a graph, wherein rendered edges are varied in thickness based on their relative importance.

9. The method of claim 8 wherein a first connection is more important than a second connection if the first connection has more travel volume than the second connection.

10. The method of claim 4 wherein the rendering is more detailed near the second and the third geographical localities than near the first or the fourth geographical localities.

11. The method of claim 4 wherein the first path is rendered as a list of geographical localities.

12. The method of claim 11 further comprising rendering an item in the list corresponding to a next geographical locality differently than an item in the list corresponding to a different geographical locality.

13. The method of claim 1 wherein identifying a popularity rating for at least the first geographical locality comprises analyzing content at one or more websites.

14. The method of claim 13 wherein the popularity rating is a function of a number of web pages having content identifying one or more of the geographical localities.

15. The method of claim 13 wherein the popularity rating is a function of page ranks of web pages having content identifying one or more of the geographical localities.

16. The method of claim 1 wherein identifying a popularity rating for at least the first geographical locality comprises analyzing content at one or more social networking sites.

17. The method of claim 1 further comprising generating a graph wherein vertices of the graph represent geographical localities and edges of the graph represent the connections.

18. The method of claim 1 further comprising generating a response to the received request by employing a computational solution for solving a directed graph problem.

19. The method of claim 1 wherein at least one of the connections is one of a railway, road, bus route, or pedestrian path.

20. The method of claim 1 wherein receiving a set of connections comprises employing a connection if the connection is a relatively straight road.

21. The method of claim 1 wherein receiving a set of connections comprises employing a connection if the connection connects two geographical localities that are separated by fewer than approximately 250 meters.

22. The method of claim 1 wherein receiving a set of connections comprises employing a connection if the connection connects two geographical localities that are on a same public transit route.

23. The method of claim 1 further comprising receiving an automatically sensed present location of a user from whom the request was received.

24. The method of claim 1 wherein the popularity rating is based on a user's indicated preference.

25. A computer-readable memory device storing instructions, the instructions comprising:
   receiving a set of four or more identifications of geographical localities, at least one of the geographical localities generally identifiable by a name or region;
   receiving a set of connections between at least a subset of the set of four or more geographical localities wherein the connections between any two geographical localities indicates a path between the two geographical localities;
   receiving a popularity rating for at least a first and a fourth geographical localities, wherein the popularity rating for the first geographical locality exceeds the popularity rating for the fourth geographical locality;
   receiving a request to provide directions from a second geographical locality to a third geographical locality;
   determining that there exist at least two paths from the second geographical locality to the third geographical locality, wherein there does not exist a connection between the second and the third geographical localities, wherein a first path includes the first geographical locality and a second path includes the fourth geographical locality; and
   identifying the first path as a preferable path because the popularity rating for the first geographical locality exceeds the popularity rating for the fourth geographical locality.

26. The computer-readable memory device of claim 25, further comprising instructions for:
   receiving a set of multiple connections between the fourth geographical locality and the second geographical locality, but selecting the first geographical locality because of a popularity rating associated with the first geographical locality; and
   causing the first path to be rendered.

27. The computer-readable memory device of claim 26, wherein the rendering is more detailed near the second and the third geographical localities than near the first or the fourth geographical localities.

28. The computer-readable memory device of claim 26, wherein the first path is rendered as a list of geographical localities.

29. The computer-readable memory device of claim 28, further comprising instructions for rendering an item in the list corresponding to a next geographical locality differently than an item in the list corresponding to a different geographical locality.

30. The computer-readable memory device of claim 25, wherein identifying a popularity rating for at least the first geographical locality comprises analyzing content at one or more websites.

31. The computer-readable memory device of claim 25, wherein identifying a popularity rating for at least the first geographical locality comprises analyzing content at one or more social networking sites.

32. The computer-readable memory device of claim 25, further comprising instructions for generating a response to the received request by employing a computational solution for solving a directed graph problem.

33. The computer-readable memory device of claim 25, wherein at least one of the connections is one of a railway, road, bus route, or pedestrian path.

34. The computer-readable memory device of claim 25, wherein receiving a set of connections comprises employing a connection if the connection is a relatively straight road.

35. The computer-readable memory device of claim 25, wherein receiving a set of connections comprises employing a connection if the connection connects two geographical localities that are separated by fewer than approximately 250 meters.

36. The computer-readable memory device of claim 25, wherein receiving a set of connections comprises employing a connection if the connection connects two geographical localities that are on a same public transit route.

37. The computer-readable memory device of claim 25, further comprising instructions for receiving an automatically sensed present location of a user from whom the request was received.

38. The computer-readable memory device of claim 25, wherein the popularity rating is based on a user's indicated preference.

39. A system, comprising:
   a component configured to receive a set of four or more identifications of geographical localities, at least one of the geographical localities generally identifiable by a name or region but not a postal address;

a component configured to receive a set of connections between at least a subset of the set of four or more geographical localities wherein the connections between any two geographical localities indicates a path between the two geographical localities;

a component configured to identify a popularity rating for at least a first geographical locality, wherein the popularity rating for the first geographical locality exceeds a popularity rating for a fourth geographical locality;

a component configured to receive a request to provide directions from a second geographical locality to a third geographical locality;

a component configured to determine that there exist at least two paths from the second geographical locality to the third geographical locality, wherein there does not exist a connection between the second and the third geographical localities, wherein a first path includes the first geographical locality but not the fourth geographical locality and a second path includes the fourth geographical locality but not the first geographical locality; and a component configured to identify the first path as a preferable path because the popularity rating for the first geographical locality exceeds the popularity rating for the second geographical locality, the first path thereby comprising connections from the second geographical locality to the first geographical locality to the third geographical locality.

40. The system of claim 39 further comprising a component configured to receive from a user an identification of a fifth geographical locality, wherein the fifth geographical locality can be included in the preferable path.

41. The system of claim 39, further comprising:
a component configured to receive a set of multiple connections between the fourth geographical locality and the second geographical locality, and to select the first geographical locality because of a popularity rating associated with the first geographical locality; and
a component configured to cause the first path to be rendered.

42. The system of claim 41, wherein the rendering is more detailed near the second and the third geographical localities than near the first or the fourth geographical localities.

43. The system of claim 41, wherein the first path is rendered as a list of geographical localities.

44. The system of claim 43, further comprising a component configured to render an item in the list corresponding to a next geographical locality differently than an item in the list corresponding to a different geographical locality.

45. The system of claim 39, further comprising a component configured to analyze content at one or more websites.

46. The system of claim 39, further comprising a component configured to analyze content at one or more social networking sites.

47. The system of claim 39, further comprising a component configured to generate a response to the received request by employing a computational solution for solving a directed graph problem.

48. The system of claim 39, wherein at least one of the connections is one of a railway, road, bus route, or pedestrian path.

49. The system of claim 39, wherein the component configured to receive the set of connections employs a connection if the connection is a relatively straight road.

50. The system of claim 39, wherein the component configured to receive the set of connections employs a connection if the connection connects two geographical localities that are separated by fewer than approximately 260 meters.

51. The system of claim 39, wherein the component configured to receive the set of connections employs a connection if the connection connects two geographical localities that are on a same public transit route.

52. The system of claim 39, further comprising a component configured to receive an automatically sensed present location of a user from whom the request was received.

53. The system of claim 39, wherein at least one popularity rating is based on a user's indicated preference.

* * * * *